United States Patent
Horiuchi et al.

(10) Patent No.: US 10,943,716 B2
(45) Date of Patent: Mar. 9, 2021

(54) PERMANENT MAGNET AND ROTARY ELECTRICAL MACHINE

(71) Applicant: KABUSHIKI KAISHA TOSHIBA, Tokyo (JP)

(72) Inventors: Yosuke Horiuchi, Tokyo (JP); Shinya Sakurada, Tokyo (JP); Naoyuki Sanada, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 399 days.

(21) Appl. No.: 15/686,196

(22) Filed: Aug. 25, 2017

(65) Prior Publication Data

US 2017/0365383 A1 Dec. 21, 2017

Related U.S. Application Data (63) Continuation of application No. PCT/JP2015/004695, filed on Sep. 15, 2015.

(51) Int. Cl.
| | |
|---|---|
| H01F 1/053 | (2006.01) |
| H01F 1/055 | (2006.01) |
| H01F 1/08 | (2006.01) |
| H01F 1/059 | (2006.01) |
| H02K 1/02 | (2006.01) |

(52) U.S. Cl.
CPC .......... *H01F 1/055* (2013.01); *H01F 1/0557* (2013.01); *H01F 1/08* (2013.01); *H01F 1/0596* (2013.01); *H02K 1/02* (2013.01)

(58) Field of Classification Search
None
See application file for complete search history.

(56) References Cited

U.S. PATENT DOCUMENTS

| | | | |
|---|---|---|---|
| 2002/0054825 | A1 | 5/2002 | Sukaki et al. |
| 2012/0075046 | A1 | 3/2012 | Hagiwara et al. |
| 2012/0242180 | A1 | 9/2012 | Horiuchi et al. |

(Continued)

FOREIGN PATENT DOCUMENTS

| | | |
|---|---|---|
| CN | 103312054 | 9/2013 |
| DE | 102013200651 | 9/2013 |

(Continued)

OTHER PUBLICATIONS

International Search Report for International Patent Application No. PCT/JP2015/004695 dated Dec. 1, 2015, 5 pages.

(Continued)

*Primary Examiner* — Xiaowei Su
(74) *Attorney, Agent, or Firm* — Amin, Turocy & Watson, LLP (57) ABSTRACT

A high-performance permanent magnet is provided. A permanent magnet expressed by a composition formula: $(R_{1-x}A_x)_p Fe_q M_r Cu_t Co_{100-p-q-r-t}$. The magnet comprises a metal structure including a plurality of crystal grains which constitutes a main phase having a $Th_2Zn_{17}$ crystal phase, An Fe concentration of each of the crystal grains is 28 atomic % or more. A concentration difference of the element A among the crystal grains is not less than 0.2 atomic % nor more than 3.0 atomic %.

7 Claims, 3 Drawing Sheets

(56) References Cited

U.S. PATENT DOCUMENTS

| | | | |
|---|---|---|---|
| 2013/0082559 A1* | 4/2013 | Hagiwara | H02K 1/2766 310/152 |
| 2013/0241681 A1 | 9/2013 | Horiuchi et al. | |
| 2015/0194246 A1 | 7/2015 | Horiuchi et al. | |
| 2015/0221422 A1* | 8/2015 | Sakurada | C22C 1/00 310/152 |
| 2015/0228385 A1* | 8/2015 | Horiuchi | H01F 1/086 310/152 |

FOREIGN PATENT DOCUMENTS

| | | |
|---|---|---|
| JP | 56-150153 | 11/1981 |
| JP | 63-157844 | 6/1988 |
| JP | 1-022970 | 4/1989 |
| JP | 6-212327 | 8/1994 |
| JP | 7-138672 | 5/1995 |
| JP | 9-111383 | 4/1997 |
| JP | 2002-155347 | 5/2002 |
| JP | 2012-204599 | 10/2012 |
| JP | 5258860 | 5/2013 |
| JP | 2013-191814 | 9/2013 |
| WO | 2015/037041 | 3/2015 |
| WO | WO-2015037037 A1 * | 3/2015 |
| WO | WO-2015037041 A1 * | 3/2015 |
| WO | 2015/044974 | 4/2015 |

OTHER PUBLICATIONS

Written Opinion for International Patent Application No. PCT/JP2015/004695 dated Dec. 1, 2015, 3 pages.

Homma, et al. "Magnetic Materials: Hard Magnetic Materials II", Journal of Magnetics Society of Japan 25 (11), 2001, pp. 1580-1588.

* cited by examiner

PERMANENT MAGNET AND ROTARY ELECTRICAL MACHINE

CROSS-REFERENCE TO RELATED APPLICATIONS

This application is a continuation of prior International Application No. PCT/JP2015/004695 filed on Sep. 15, 2015; the entire contents of all of which are incorporated herein by reference.

FIELD

Embodiments described herein relate generally to a permanent magnet and a rotary electrical machine.

BACKGROUND

Known examples of a high-performance rare earth magnet include a Sm—Co based magnet, a Nd—Fe—B based magnet, and the like. Fe and Co in the magnets contribute to an increase in saturation magnetization. These magnets contain rare earth elements such as Nd and Sm, which brings about large magnetic anisotropy derived from behavior of a 4f electron of the rare earth element in a crystal field. This enables to obtain large coercive force, resulting in that a high-performance magnet is realized.

Such high-performance magnets are mainly used in electrical apparatuses, such as a motor, a speaker, and a measuring device. In recent years, there is an increasing demand for reduction in size and weight and reduction in power consumption of various electrical apparatuses, and in order to address such demands, there is a demand for a higher-performance permanent magnet whose maximum magnetic energy product (BHmax) is improved. Further, in recent years, a variable magnetic flux motor has been proposed, which contributes to increase in efficiency of a motor.

The Sm—Co based magnet has a high Curie temperature, and thus can realize good motor property at a high temperature, but, it is desired to realize higher coercive force, higher magnetization, and improvement of squareness ratio. It can be considered that it is effective to increase a degree of concentration of Fe, in order to realize high magnetization of the Sm—Co based magnet. However, in a conventional manufacturing method, the squareness ratio is sometimes lowered by increasing the Fe concentration. In order to realize a high-performance magnet for motor, a technology is required which improves magnetization and enables exertion of good squareness ratio in a composition with high Fe concentration.

DETAILED DESCRIPTION

A permanent magnet of an embodiment is expressed by a composition formula: $(R_{1-x}A_x)_p Fe_q M_r Cu_t Co_{100-p-q-r-t}$. A is at least one element selected from the group consisting of Ce, Pr, and Nd, R is at least one element selected from the group consisting of rare earth elements except for the element A, M is at least one element selected from the group consisting of Zr, Ti, and Hf, x is a number satisfying $0.02 \leq x \leq 0.2$, p is a number satisfying $10.5 \leq p \leq 12.4$ atomic %, q is a number satisfying $28 \leq q \leq 40$ atomic %, r is a number satisfying $0.88 \leq r \leq 4.3$ atomic %, and t is a number satisfying $3.5 \leq t \leq 13.5$ atomic %. The magnet comprises a metal structure a plurality of crystal grains which constitutes a main phase having a $Th_2Zn_{17}$ crystal phase. An Fe concentration of each of the crystal grains is 28 atomic % or more. A concentration difference of the element A among the crystal grains is not less than 0.2 atomic % nor more than 3.0 atomic %.

Hereinafter, embodiments will be described with reference to the drawings. The drawings are schematic, and a relation between a thickness and a plane dimension, a ratio of thicknesses of respective layers, and the like, for example, may be different from actual ones. Further, in the embodiments, the same reference numerals are given to practically the same components, and explanation will be omitted.

First Embodiment

A permanent magnet of the present embodiment will be described hereinafter.

Configuration Example of Permanent Magnet

The permanent magnet of the present embodiment has a composition expressed by a composition formula: $(R_{1-x}A_x)_p Fe_q M_r Cu_t Co_{100-p-q-r-t}$ (where A is at least one element selected from the group consisting of Ce, Pr, and Nd, R is at least one element selected from the group consisting of rare earth elements except for the element A, M is at least one element selected from the group consisting of Zr, Ti, and Hf, x is a number satisfying $0.02 \leq x \leq 0.2$, p is a number satisfying $10.5 \leq p \leq 12.4$ atomic %, q is a number satisfying $28 \leq q \leq 40$ atomic %, r is a number satisfying $0.88 \leq r \leq 4.3$ atomic %, and t is a number satisfying $3.5 \leq t \leq 13.5$ atomic %).

In the above composition formula, A is an element which contributes to improvement of magnetization. As the element A, there can be cited at least one element selected from the group consisting of cerium (Ce), praseodymium (Pr), and neodymium (Nd), for example. The element A has an effective magnetic moment higher than that of Sm, and it is a light rare earth element, similarly to Sm, so that it contributes to improvement of magnetization. When a value of x in the above composition formula exceeds 0.2 (when the content of the element A exceeds 2.48 atomic %), there is a chance that a number of hetero-phase increases to reduce magnetic properties. When the value of x is less than 0.02 (when the content of the element A is less than 0.21 atomic %), the effect of increasing the magnetization is small. For example, by setting 50 atomic % or more of the element A to Pr, it is possible to further improve the magnetization of the permanent magnet.

In the above composition formula, R is an element capable of bringing about large magnetic anisotropy to a magnet material. As the element R, there can be cited at least one element selected from the group consisting of rare earth elements except for the element A. Examples of the element R include yttrium (Y) and samarium (Sm). It is preferable to use Sm, in particular. For example, when plural elements including Sm are used as the element R, by setting a Sm concentration to 50 atomic % or more of all of the elements applicable as the element R, it is possible to increase a performance of the magnet material, which is, for example, coercive force. It is more preferable that 70 atomic % or more, further, 90% or more, of the elements applicable as the element R is set to Sm.

When p (the total content of the element R and the element A) in the above composition formula is less than 10.5 atomic %, a large amount of α-Fe precipitates and the coercive force becomes small, and when p in the above composition formula exceeds 12.4 atomic %, saturation magnetization is lowered. In the above composition formula, p is more preferably not less than 10.9 atomic % nor more than 12.1 atomic %, and further, not less than 11.0 atomic % nor more than 12.0 atomic %.

In the above composition formula, M is an element enabling exertion of large coercive force in a composition with high Fe concentration. As the element M, for example, one element or plural elements selected from the group consisting of titanium (Ti), zirconium (Zr), and hafnium (Hf) is/are used. When r in the above composition formula exceeds 4.3 atomic %, a hetero-phase excessively containing the element M is likely to be generated, resulting in that both coercive force and magnetization become likely to decrease. When r (the content of the element M) in the above composition formula is less than 0.88 atomic %, the effect of increasing the Fe concentration is likely to be small. The content of the element M is more preferably not less than 1.14 atomic % nor more than 3.58 atomic %, and further, greater than 1.49 atomic % and equal to or less than 2.24 atomic %, and still further, not less than 1.55 atomic % nor more than 2.23 atomic %.

The element M preferably includes at least Zr. In particular, by setting 50 atomic % or more of the element M to Zr, it is possible to increase the coercive force of the permanent magnet. On the other hand, Hf is expensive among the element M, so that even when Hf is used, the amount of Hf to be used is preferably small. For example, a concentration of Hf is preferably less than 20 atomic % of the element M.

Cu is an element capable of making the magnet material exert high coercive force. When t (the content of Cu) in the above composition formula exceeds 13.5 atomic %, magnetization is likely to decrease. When t in the above composition formula is less than 3.5 atomic %, it becomes difficult to obtain high coercive force and good squareness ratio. The content of Cu is more preferably not less than 3.9 atomic % nor more than 9.0 atomic %, and further, not less than 4.3 atomic % nor more than 5.8 atomic %.

Fe is an element responsible mainly for magnetization of the magnet material. By compounding a large amount of Fe, it is possible to increase the saturation magnetization of the magnet material, but, if Fe is excessively compounded, it becomes difficult to obtain a desired crystal phase due to precipitation of α-Fe or phase separation, resulting in that the coercive force may be decreased. Therefore, the content q is preferably not less than 28 atomic % nor more than 40 atomic %. The content q of Fe is more preferably not less than 29 atomic % nor more than 36 atomic %, and further, not less than 30 atomic % nor more than 33 atomic %.

Co is an element responsible for magnetization of the magnet material and capable of making the magnet material exert high coercive force. Further, if a large amount of Co is compounded, a high Curie temperature can be obtained, which enables to increase heat stability of the magnetic property. If a compounding amount of Co is small, these effects become small. However, if Co is excessively added, a proportion of Fe relatively decreases, which may cause reduction in magnetization. Further, by replacing 20 atomic % or less of Co with one element or plural elements selected from the group consisting of Ni, V, Cr, Mn, Al, Si, Ga, Nb, Ta, and W, the magnetic property, for example, the coercive force, can be increased.

The permanent magnet of the present embodiment includes a two-dimensional metal structure which includes a main phase having a $Th_2Zn_{17}$ crystal phase (2-17 crystal phase) of hexagonal system, and a grain boundary phase provided between crystal grains which form the main phase. Further, the main phase includes a cell phase having the 2-17 crystal phase and a Cu-rich phase having a $CaCu_5$ crystal phase (1-5 crystal phase) of hexagonal system. The Cu-rich phase is preferably formed to surround the cell phase. The above-described structure is also referred to as a cell structure. Further, the Cu-rich phase also includes a cell wall phase which divides the cell phase. A c-axis of the $Th_2Zn_{17}$ crystal phase is preferably provided in parallel to or substantially in parallel to an easy magnetization axis. "Substantially in parallel" means a direction within a range of not less than −10 degrees nor more than 10 degrees from a parallel direction, for example.

The Cu-rich phase is a phase having high Cu concentration. The Cu concentration of the Cu-rich phase is higher than the Cu concentration of the $Th_2Zn_{17}$ crystal phase. For example, the Cu concentration of the Cu-rich phase is preferably 1.2 times or more the Cu concentration of the $Th_2Zn_{17}$ crystal phase. The Cu-rich phase exists linearly or in a plate state in a cross section which includes the c-axis in the $Th_2Zn_{17}$ crystal phase, for example. A structure of the Cu-rich phase is not limited in particular, and there can be cited, for example, a $CaCu_5$ crystal phase (1-5 crystal phase) of hexagonal system, or the like. Further, the permanent magnet may also have plural Cu-rich phases with different phases.

Magnetic domain wall energy of the Cu-rich phase is higher than magnetic domain wall energy of the $Th_2Zn_{17}$ crystal phase, and a difference between the magnetic domain wall energies becomes a barrier to magnetic domain wall displacement. Specifically, since the Cu-rich phase functions as a pinning site, it is possible to suppress magnetic domain wall displacement among plural cell phases. In particular, by forming a cell structure, the effect of suppressing magnetic domain wall displacement is increased. This is also referred to as a magnetic domain wall pinning effect. Therefore, it is more preferable that the Cu-rich phase is formed so as to surround the cell phase.

In the Sm—Co based magnet containing 28 atomic % or more of Fe, the Cu concentration of the Cu-rich phase is preferably not less than 10 atomic % nor more than 60 atomic %. By increasing the Cu concentration of the Cu-rich phase, it is possible to increase the coercive force and the squareness ratio. In a region with high Fe concentration, a variation in Cu concentration of the Cu-rich phase is likely to occur, and, for example, a Cu-rich phase having a large magnetic domain wall pinning effect and a Cu-rich phase having a small magnetic domain wall pinning effect are generated, resulting in that the coercive force and the squareness ratio decrease. The Cu concentration of the Cu-rich phase is more preferably not less than 30 atomic % nor more than 60 atomic %, and further, not less than 40 atomic % nor more than 60 atomic %.

When a magnetic domain wall out of a pinning site is displaced, magnetization reverses by a quantity of displacement, resulting in that the magnetization decreases. If, in a case of applying an external magnetic field, the magnetic domain walls come out of the pinning site at once in a certain magnetic field, magnetization becomes difficult to decrease by application of the magnetic field, and a good squareness ratio can be obtained. In other words, it can be considered that if, in the case of applying the magnetic field, the magnetic domain wall comes out of the pinning site in a magnetic field lower than the coercive force and the magnetic domain wall is displaced, the magnetization decreases by the quantity of displacement, which leads to deterioration of the squareness ratio.

Figure 1:
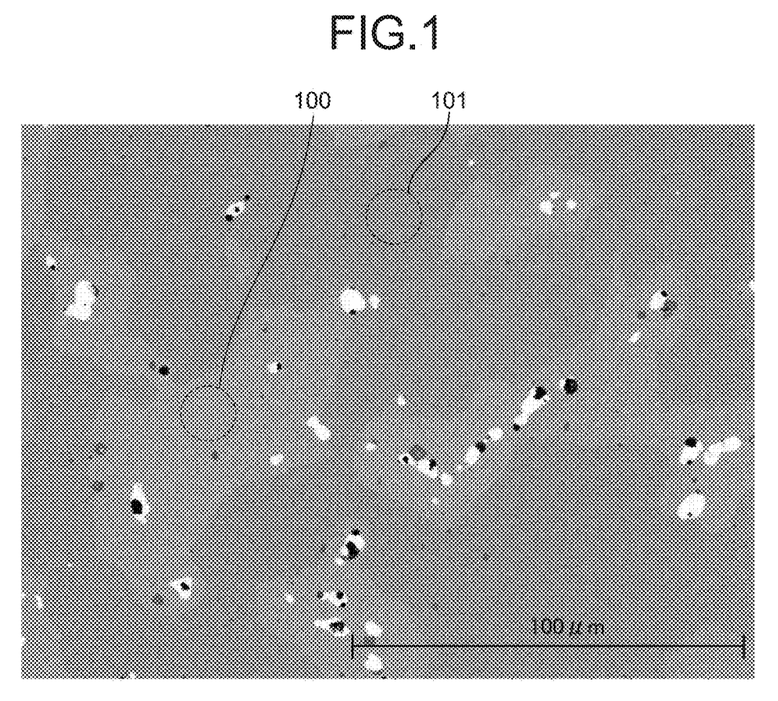
FIG. 1 is a SEM reflected electron image illustrating a part of a main phase of a conventional Sm—Co based magnet.

In the Sm—Co based magnet having high iron concentration of 28 atomic % or more, the squareness ratio may decrease if the element A is added. FIG. 1 is a reflected electron image of a scanning electron microscope (SEM), illustrating a part of a main phase of a conventional Sm—Co based magnet which contains Pr as the element A. As illustrated in FIG. 1, the Sm—Co based magnet containing Pr sometimes has a main phase including a region 100 and a region 101 having mutually different gray contrasts. The region 100 has a high Pr concentration and a low Sm concentration. The region 101 has a low Pr concentration and a high Sm concentration. As described above, if there are plural regions having different concentrations of the element A in the main phase, reduction in magnetic property, the squareness ratio, in particular, is caused. In order to reduce the regions having different concentrations of the element A in the main phase, it is preferable to control the concentration difference (variation of concentrations) of the element A to fall within a predetermined range, among crystal grains forming the main phase.

Figure 2:
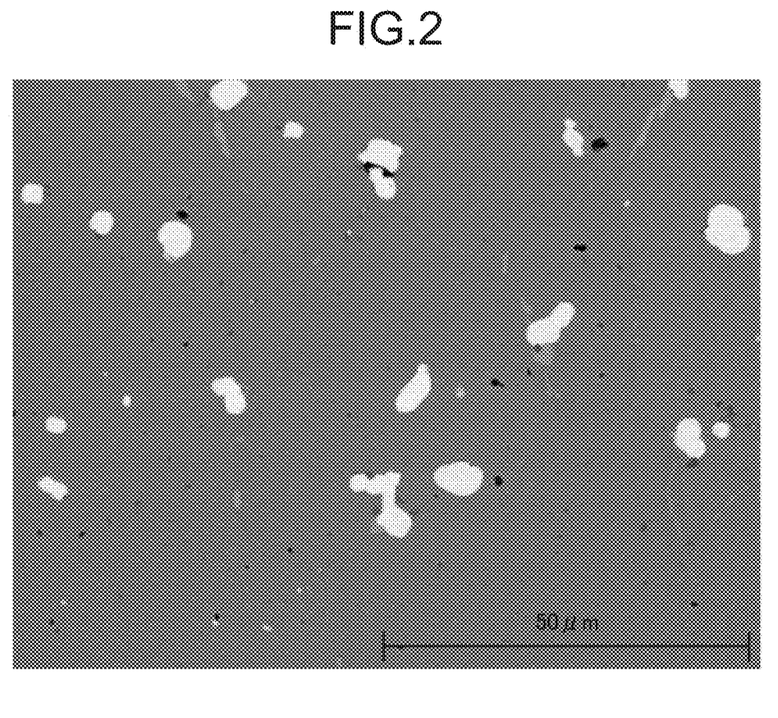
FIG. 2 is a SEM reflected electron image illustrating a part of a main phase of a permanent magnet of the present embodiment.

FIG. 2 is a reflected electron image of SEM, illustrating a part of a main phase of the permanent magnet of the present embodiment. In the permanent magnet of the present embodiment, an Fe concentration of each of plural crystal grains which form the main phase is 28 atomic % or more, and a concentration difference of the element A among the plural crystal grains is not less than 0.2 atomic % nor more than 3.0 atomic %. By reducing the concentration difference of the element A among the plural crystal grains in the permanent magnet having the high Fe concentration of 28 atomic % or more, it is possible to reduce plural regions having different concentrations of the element A, as illustrated in FIG. 2. Consequently, it is possible to suppress deterioration of the squareness ratio while increasing the magnetization.

The composition of the permanent magnet is measured by, for example, an ICP (Inductively Coupled Plasma) emission spectrochemical analysis method, SEM-EDX (SEM-Energy Dispersive X-ray Spectroscopy), TEM-EDX (Transmission Electron Microscope-EDX), or the like. A volume ratio of each phase is judged in a comprehensive manner by using observation with an electron microscope or an optical microscope in combination with X-ray diffraction, and the like, and can be determined by an areal analysis method of an electron micrograph obtained by photographing a cross section of the permanent magnet. As the cross section of the permanent magnet, a cross section of a practically center part of a surface of a specimen having a maximum area is set to be used.

A concentration difference $C_A$ (dis) of the element A among plural crystal grains is defined as follows. First, a part of a main phase is subjected to SEM observation in a field of view at a magnification of 500 times, to thereby obtain a reflected electron image. With respect to an arbitrary square region of 100 μm in length and 100 μm in width in the obtained reflected electron image, plural straight lines are drawn along a longitudinal direction and a lateral direction of the square region at intervals of 20 μm, thereby dividing one square region into plural square regions each having 20 μm in length and 20 μm in width. At each intersection point between the straight line in the longitudinal direction and the straight line in the lateral direction, a concentration of the element A is analyzed through the SEM-EDX. The obtained pieces of data regarding the concentrations of the element A at the respective intersection points are arranged in ascending order, and in a range of numeric values from a minimum value to a maximum value of the concentrations of the element A, an average value of the concentrations of the element A of top 10 values ($C_A$ (A)) and an average value of the concentrations of the element A of bottom 10 values ($C_A$ (B)) are determined. A difference between the $C_A$ (A) and the $C_A$ (B) is set as $C_A$ (dis). Specifically, the concentration difference of the element A among the plural crystal grains is defined by the difference between the average value of the concentrations of the element A of the top 10 values and the average value of the concentrations of the element A of the bottom 10 values in the range of numeric values from the minimum value to the maximum value of the concentrations of the element A of the respective crystal grains.

The metal structure such as the $Th_2Zn_{17}$ crystal phase and the Cu-rich phase is recognized as follows, for example. First, a scanning transmission electron microscope (STEM) is used to perform observation of a sample. At this time, by observing the sample by SEM, a location of a grain boundary phase is specified, and by processing the sample by using a focused ion beam (FIB) so that the grain boundary phase is included in a field of view, it is possible to increase an observation efficiency. The above-described sample is a sample after being subjected to aging treatment. At this time, the sample is preferably an unmagnetized one.

Next, a concentration of each element of the cell phase, the Cu-rich phase, and the like is measured by a STEM-energy dispersive X-ray spectroscopy (STEM-EDX) using STEM, for example.

When the concentration of each element is measured by the STEM-EDX, a specimen for measurement is cut out from 1 mm or more inside of a surface of the sample. Further, a surface parallel to an easy magnetization axis (c-axis) is observed at an observation magnification of 100 k times.

For the performance of concentration measurement of the element of each phase, 3-dimension atom probe (3DAP) may also be used. An analysis method using the 3DAP is an analysis method in which an observation specimen is field-evaporated by applying a voltage, and field-evaporated ions are detected by a two-dimensional detector to specify atomic arrangement. Ion species are identified based on a time of flight until when the ions reach the two-dimensional detector, individually-detected ions are continuously detected in a depth direction, and the ions are arranged in sequence of detection (restructured), resulting in that a three-dimensional atomic distribution is obtained. When compared to the concentration measurement by TEM-EDX, each element concentration in each crystal phase can be measured more accurately.

The measurement of the element concentration in each phase by the 3DAP is carried out in accordance with the following procedure. First, a specimen is made into a thin piece by dicing, from which an acicular specimen for pickup atom probe (AP) is fabricated by FIB.

The measurement by the 3DAP is performed on an inner part of a sintered compact. The measurement of the inner part of the sintered compact is performed as follows. First, in a center part of a longest edge in a surface having a maximum area, compositions are measured at a surface part and an inner part of a cross section which is cut perpendicularly to the edge (in the case of a curved line, perpendicularly to a tangent in the center part). As measurement positions, there are provided a first reference line drawn perpendicular to an edge and inward to an end part from a position of ½ of each edge on the above-described cross section as a start point, and a second reference line drawn inward to an end part from a center of each corner as a start point at a position of ½ of an internal angle of the corner, and each position at 1% of the length of the reference line from the start point of each of these first reference line and second reference line is defined as the surface part and each position at 40% thereof is defined as the inner part. When the corner has a curvature by chamfering or the like, an intersection point of extended adjacent edges is taken as an end part (center of the corner) of the edge. In this case, it is set that the measurement position is a position not from the intersection point but from a part which is in contact with the reference line.

By setting the measurement positions as above, when the cross section is a quadrangle, for example, the number of reference lines is eight in total, including four first reference lines and four second reference lines, and the number of measurement positions is eight at each of the surface part and the inner part. In the present embodiment, it is preferable that all of the eight positions at each of the surface part and the inner part have a composition which falls within the above-described composition range, but, it is only required that at least four positions or more at each of the surface part and the inner part have a composition which falls within the above-described composition range. In this case, a relation between the surface part and the inner part of one reference line is not defined. An observation surface of the inner part of the sintered compact defined as above is smoothed by polishing and then observed. For example, observation positions of TEM-EDX in the concentration measurement are set to arbitrary 20 points in each phase, an average value of measurement values excluding a maximum value and a minimum value from the measured values at each position is determined, and this average value is set to a concentration of each element. The measurement of 3DAP is also performed based thereon.

In the measurement result of the concentration in the Cu-rich phase obtained by using the 3DAP described above, it is preferable that a concentration profile of Cu in the Cu-rich phase is sharper. Concretely, a full width at half maximum (FWHM) of the concentration profile of Cu is preferably 5 nm or less, and in such a case, it is possible to obtain higher coercive force. This is because, when the distribution of Cu in the Cu-rich phase is sharp, a magnetic domain wall energy difference between the cell phase and the Cu-rich phase occurs suddenly, resulting in that a magnetic domain wall becomes more likely to be pinned.

The full width at half maximum (FWHM) of the concentration profile of Cu in the Cu-rich phase is determined as follows. Based on the above-described method, a highest value of the Cu concentration (PCu) is determined from the Cu profile of the 3DAP, and a width of a peak whose value is half this value (PCu/2), namely, the full width at half maximum (FWHM) is determined. Such measurement is performed on 10 peaks, and an average value of these values is defined as the full width at half maximum (FWHM) of the Cu profile. When the full width at half maximum (FWHM) of the Cu profile is 3 nm or less, an effect of increasing coercive force is further improved, and when it is 2 nm or less, a further excellent improvement effect of coercive force can be obtained.

The squareness ratio is defined as follows. First, a DC magnetizing property at a room temperature is measured by using a DC B-H tracer. Next, from a B-H curved line obtained from a measurement result, residual magnetization $M_r$, coercive force $_iH_C$, and a maximum energy product (BH) max being basic properties of a magnet are determined. At this time, a theoretical maximum value (BH) max is determined through the following formula (1) by using $M_r$.

$$(BH)max(theoretical\ value) = M_r^2/4\mu_o \quad (1)$$

The squareness ratio is evaluated by a ratio between (BH) max obtained through the measurement and (BH) max (theoretical value), and is determined through the following formula (2).

$$(BH)max(actual\ measured\ value)/(BH)max(theoretical\ value) \times 100 \quad (2)$$

The above-described permanent magnet is also used as, for example, a bond magnet. For example, by using the above-described permanent magnet for a variable magnet in a variable magnetic flux drive system such as one disclosed in Japanese Patent Application No. 2008-29148 or Japanese Patent Application No. 2008-43172, it becomes possible to realize high efficiency, reduction in size, and cost reduction of the system. In order to use the above-described permanent magnet as the variable magnet, it is necessary to change an aging treatment condition, to thereby set, for example, the coercive force to not less than 100 kA/M nor more than 350 kA/M.

<Manufacturing Method of Permanent Magnet>

Next, an example of a manufacturing method of a permanent magnet will be described. First, an alloy powder containing a predetermined element necessary for synthesizing a permanent magnet is prepared. Next, the alloy powder is filled in a mold placed in an electromagnet, and is press-formed while a magnetic field is applied thereto, to thereby manufacture a green compact whose crystal axes are oriented.

For example, by grinding an alloy ingot obtained by casting a molten metal obtained by using an arc melting method or a high-frequency melting method, the alloy powder can be prepared. The alloy powder may also have a desired composition by blending plural powders with different compositions. Further, the alloy powder may also be prepared by using a mechanical alloying method, a mechanical grinding method, a gas atomization method, a reduction diffusion method, or the like. When producing an alloy thin strip using a strip cast method, a flake-shaped alloy thin strip is produced, and then the alloy thin strip is ground, to thereby prepare the alloy powder. For example, by tiltingly injecting an alloy molten metal to a chill roll rotating at a circumferential speed of not less than 0.1 m/second nor more than 20 m/second, it is possible to produce a thin strip which is continuously solidified to have a thickness of 1 mm or less. When the circumferential speed is less than 0.1 m/second, a composition variation is likely to occur in the thin strip. Further, when the circumferential speed exceeds 20 m/second, crystal grains are refined too much, and therefore the magnetic property may decrease. The circumferential speed of the chill roll is not less than 0.3 m/second nor more than 15 m/second, and more preferably not less than 0.5 m/second nor more than 12 m/second.

Further, by performing heat treatment on the above-described alloy powder or a material of an alloy before grinding, it is possible to homogenize the material. The material can be ground by using, for example, a jet mill, a ball mill, or the like. By grinding the material in an inert gas atmosphere or an organic solvent, it is possible to prevent oxidation of the powder.

If the powder obtained after the grinding has an average grain diameter of not less than 2 μm nor more than 5 μm, and a proportion of powder having a grain diameter of not less than 2 μm nor more than 10 μm is 80% or more of the whole powder, a degree of orientation becomes high, and further, the coercive force becomes large. In order to realize this, grinding by the jet mill is preferable.

For example, when grinding by the ball mill is performed, even if the average grain diameter of the powder is not less than 2 μm nor more than 5 μm, a large amount of fine powder whose grain diameter is of a sub-micron level is contained. When the fine powder aggregates, c-axes of crystals in the $TbCu_7$ phase become unlikely to align in a direction of easy magnetization axis during magnetic field orientation at the time of performing pressing, and the degree of orientation is likely to deteriorate. Further, such a fine powder may increase an amount of oxide in a sintered compact to decrease coercive force. In particular, when the Fe concentration is 28 atomic % or more, a proportion of powder having a grain diameter of 10 μm or more in the powder after the grinding is desirably 10% or less of the whole powder. When the Fe concentration is 28 atomic % or more, an amount of hetero-phase in the ingot to be a raw material increases. In the hetero-phase, the amount of powder increases, and in addition to that, the grain diameter also tends to increase, and the grain diameter sometimes becomes 20 μm or more.

When grinding such an ingot, a powder having a grain diameter of 15 μm or more, for example, sometimes becomes a hetero-phase powder as it is. When the ground powder containing such a hetero-phase coarse powder is pressed in a magnetic field into a sintered compact, the hetero-phase remains to cause decrease in coercive force, decrease in magnetization, decrease in squareness, and so on. When the squareness decreases, the magnetization becomes difficult to occur. In particular, magnetization after assembly to a rotor or the like becomes difficult to occur. As described above, by setting the powder having the grain diameter of 10 μm or more to 10% or less of the whole, it is possible to increase the coercive force while suppressing the decrease in squareness ratio in the high Fe concentration composition containing 28 atomic % or more of Fe.

Next, sintering is performed on the above-described green compact. At this time, when a variation of concentrations of the element A of respective powder regions in the green compact is large, plural regions with different concentrations of the element A as illustrated in FIG. 1 are sometimes formed. As one of reasons why the plural regions with different concentrations of the element A are formed, there can be cited a change in a melting point due to the addition of the element A. The element A is an element which easily increases the melting point, when compared to Fe. Therefore, when a variation of concentrations of the element A of respective regions in an ingot is large, a region with high iron concentration and low melting point, and a region with high concentration of the element A and high melting point, are likely to be formed. For example, there is formed an element A-rich region, an iron-rich region, an element R-rich region, an element R-poor region, or the like. Therefore, a variation of the melting point becomes large also in a green compact which is formed by using a powder obtained by grinding the ingot.

When the sintering is performed on the above-described green compact, there exist a region which is easily melted and a region which is difficult to be melted, due to the difference in the melting point, so that plural regions with different concentrations of the element A are likely to be formed. For example, the sintering progresses while the region which is easily melted is melted. On the contrary, the region which is difficult to be melted sometimes remains as it is as a solid body. Therefore, when a sintering temperature is low, the element A and the like are not sufficiently diffused, resulting in that a main phase having plural regions with different concentrations of the element A as described above is formed. Consequently, the concentration difference of the element A among crystal grains is likely to increase.

In the manufacturing method of the permanent magnet of the present embodiment, sintering is performed through heat treatment for not less than 1 hour nor more than 15 hours at a temperature of not less than 1220° C. nor more than 1260° C. When a sintering temperature is less than 1220° C., there is a case where the sintering does not proceed sufficiently in a region of high melting point, and evenness of a metal structure decreases. When the sintering temperature is higher than 1260° C., the magnetic property may decrease due to excessive evaporation of the element R such as Sm in the powder. The sintering temperature is more preferably not less than 1230° C. nor more than 1250° C., for example. When a retention time is less than 1 hour, a density is likely to become uneven, resulting in that magnetization is likely to decrease, and further, a crystal grain diameter of the sintered compact decreases and a grain boundary phase ratio increases, resulting in that the magnetization is likely to decrease. Further, when the heat treatment time exceeds 15 hours, the element R in the powder excessively evaporates, which may reduce the magnetic property. The retention time is more preferably not less than 2 hours nor more than 13 hours, and still more preferably not less than 3 hours nor more than 10 hours. In the above-described sintering, after a molded body is set in a chamber, a vacuum state is created, the vacuum is kept until the temperature becomes close to the retention temperature, the atmosphere is then switched to an inert atmosphere of Ar or the like, and isothermal holding is performed, to thereby make it possible to increase a sintered compact density.

Next, solution heat treatment is performed. The solution heat treatment is treatment for forming a $TbCu_7$ crystal phase (1-7 crystal phase) to be a precursor of a phase separation structure. When the element A is added, a stabilized region of the $TbCu_7$ phase is likely to shift on a low temperature side. Therefore, when a temperature of the solution heat treatment is high, plural regions with different concentrations of the element A as illustrated in FIG. 1 are likely to be formed. In the manufacturing method of the permanent magnet of the present embodiment, the solution heat treatment is carried out by performing retention for not less than 8 hours nor more than 28 hours at a temperature lower than the sintering temperature by 80° C. or more (the sintering temperature—80° C., or less). When the above-described temperature is a temperature greater than the sintering temperature—80° C., the generation of the $TbCu_7$ phase sometimes becomes unstable. The temperature of the solution heat treatment is more preferably a temperature lower than the sintering temperature by 90° C. or more (the sintering temperature—90° C., or less).

The temperature of the solution heat treatment is preferably a temperature of 1070° C. or more, for example. When the temperature of the solution heat treatment is less than 1070° C., a proportion of the $TbCu_7$ crystal phase existing in the specimen after the solution heat treatment is small, which may reduce the magnetic property. The temperature of the solution heat treatment is more preferably 1100° C. or more, for example. When the retention time at the time of performing the solution heat treatment is less than 8 hours, constituent phases are likely to become uneven, the coercive force is likely to decrease, the crystal grain diameter of the metal structure is likely to become small, a grain boundary phase ratio becomes high, and therefore the magnetization is likely to decrease. Further, when the retention temperature at the time of performing the solution heat treatment exceeds 28 hours, the magnetic property may decrease due to evaporation of the element R in the sintered compact, or the like. The retention time is preferably not less than 12 hours nor more than 18 hours. By performing the solution heat treatment in a vacuum or an inert atmosphere of argon gas or the like, it is possible to suppress oxidation of the powder.

Further, rapid cooling is performed after the isothermal holding. For example, by performing the rapid cooling to a room temperature at a cooling rate set to 170° C./minute or more, it is possible to stabilize the $TbCu_7$ crystal phase, and the coercive force becomes likely to be exerted. When the cooling rate is less than 170° C./minute, a $Ce_2Ni_7$ crystal phase (2-7 crystal phase) is likely to be generated during the cooling. Due to the existence of the 2-7 crystal phase, the magnetization may decrease, and further, the coercive force may also decrease. This is because Cu is often concentrated in the 2-7 crystal phase, this causes reduction in the Cu concentration in the main phase, resulting in that the phase separation by aging treatment becomes unlikely to occur. In particular, in the composition containing 28 atomic % or more of Fe concentration, the cooling rate is likely to become important.

It is also possible to perform quality improvement treatment, between the sintering and the solution heat treatment. The quality improvement treatment is treatment for controlling a metal structure, particularly a macrostructure. In the quality improvement treatment, for example, heat treatment is carried out by performing retention for not less than 2 hours nor more than 12 hours at a temperature lower than the heat treatment temperature when performing the sintering by 10° C. or more and higher than the heat treatment temperature when performing the solution heat treatment by 10° C. or more. When the heat treatment is not performed at the temperature lower than the heat treatment temperature when performing the sintering by 10° C. or more, it is not possible to sufficiently remove a hetero-phase derived from a liquid phase generated during the sintering. An orientation of the hetero-phase is often low, so that when the hetero-phase exists, a crystal orientation of the crystal grain becomes likely to deviate in relation to the easy magnetization axis, resulting in that the squareness ratio decreases, and in addition to that, the magnetization is also likely to decrease. Further, in the solution heat treatment, the temperature is low, so that it is difficult to sufficiently remove the heterophase generated during the sintering, from a viewpoint of an element diffusion speed. Further, a grain growth speed is also slow, so that a sufficient crystal grain diameter may not be able to be obtained, resulting in that improvement of the squareness ratio cannot be expected. In contrast, by performing the quality improvement treatment by setting the temperature to be higher than the retention temperature when performing the solution heat treatment by 10° C. or more, it is possible to sufficiently remove the above-described hetero-phase, to thereby increase the crystal grain forming the main phase.

The retention temperature when performing the quality improvement treatment is preferably not less than 1180° C. nor more than 1210° C., for example. When the retention temperature is less than 1180° C. and when it exceeds 1210° C., the squareness ratio may decrease. Further, when the heat treatment time is less than 2 hours, diffusion is insufficient, and the hetero-phase is not sufficiently removed, resulting in that the effect of improvement of squareness ratio is small. Further, when the heat treatment time exceeds 12 hours, there is a possibility that the element R such as Sm evaporates, and good magnetic property cannot be obtained. The heat treatment time in the quality improvement treatment is more preferably not less than 4 hours nor more than 10 hours, and still more preferably not less than 6 hours nor more than 8 hours. Further, it is preferable to perform the quality improvement treatment in a vacuum or in an inert atmosphere of argon gas or the like, in order to prevent oxidation.

Next, aging treatment is performed on the sintered compact after being subjected to the rapid cooling. The aging treatment is treatment in which the metal structure is controlled to increase the coercive force of the magnet, and is intended to phase-separate the metal structure of the magnet into plural phases.

In the aging treatment, the sintered compact is heated to a temperature of not less than 760° C. nor more than 850° C., and then retained at that attained temperature for not less than 20 hours nor more than 60 hours (first retention). Next, the sintered compact is subjected to slow cooling to a temperature of not less than 350° C. nor more than 650° C. at a cooling rate of not less than 0.2° C./minute nor more than 2.0° C./minute, and then retained at that attained temperature for not less than 0.5 hours nor more than 8 hours (second retention), thereby performing heat treatment. After that, the sintered compact is cooled to a room temperature. A sintered compact magnet can be obtained in a manner as described above.

When the retention temperature is higher than 850° C. in the first retention, the cell phase becomes coarse, and the squareness ratio is likely to decrease. Further, when the retention temperature is less than 760° C., a cell structure cannot be sufficiently obtained, and the coercive force becomes difficult to be exerted. The retention temperature in the first retention is more preferably not less than 780° C. nor more than 840° C., for example. Further, when the retention time is less than 20 hours in the first retention, the cell structure becomes insufficient, and the coercive force becomes difficult to be exerted. Further, when the retention time is more than 60 hours, there is a possibility that a cell wall phase becomes excessively thick, and the squareness ratio deteriorates. The retention time in the first retention is more preferably not less than 25 hours nor more than 40 hours, for example.

When the cooling rate at the time of performing the slow cooling is less than 0.2° C./minute, the cell wall phase becomes excessively thick, and the magnetization is likely to decrease. Further, when the cooling rate exceeds 2.0° C./minute, a difference between Cu concentrations of the cell phase and the cell wall phase cannot be sufficiently obtained, resulting in that the coercive force is likely to decrease. The cooling rate when performing the slow cooling is more preferably not less than 0.4° C./minute nor more than 1.5° C./minute, and further, not less than 0.5° C./minute nor more than 1.3° C./minute, for example. Further, when the slow cooing is performed to less than 350° C., the low-temperature hetero-phase as described above is likely to be generated. Further, when the slow cooling is performed to a temperature exceeding 650° C., there is a case where the Cu concentration in the Cu-rich phase does not become sufficiently high, and sufficient coercive force cannot be obtained. Further, when the retention time in the second retention exceeds 8 hours, there is a possibility that a low-temperature hetero-phase is generated, and a sufficient magnetic property cannot be obtained.

In the aging treatment, the sintered compact may be retained at a predetermined temperature for a certain period of time when performing the slow cooling, and then slow cooling may be further performed. Further, it is also possible that the above-described aging treatment is set as main aging treatment, and preliminary aging treatment is performed before the main aging treatment by retaining the sintered compact at a temperature lower than the retention temperature in the first retention, and for a period of time shorter than the retention time in the first retention. By the retention when performing the above-described slow cooling and the preliminary aging treatment, it is possible to further increase the squareness ratio.

The quality improvement treatment is only required to be performed after the sintering and before the aging treatment. For example, it is also possible that the solution heat treatment is divided into first solution heat treatment and second solution heat treatment (also referred to as re-solution heat treatment), the quality improvement treatment is performed after the first solution heat treatment, and the second solution heat treatment is performed after the quality improvement treatment. Further, the quality improvement treatment may be performed a plurality of times between the solution heat treatments.

As described above, according to the manufacturing method of the permanent magnet of the present embodiment, by adjusting the conditions of the sintering and the solution heat treatment, it is possible to make each of the crystal grains forming the main phase have a high iron concentration of 28 atomic % or more, and to reduce the concentration difference of the element A among the plural crystal grains. Therefore, it is possible to improve the magnetic properties such as the squareness ratio.

Second Embodiment

The permanent magnet of the first embodiment can be used for rotary electrical machines such as various motors and an electric generator. Further, it is also possible to use the permanent magnet of the first embodiment as a stationary magnet or a variable magnet of a variable magnetic flux motor or a variable magnetic flux electric generator. By using the permanent magnets of the first embodiment, various motors and electric generators are configured. When the permanent magnet of the first embodiment is applied to the variable magnetic flux motor, technologies disclosed in Japanese Patent Application No. 2008-29148 and Japanese Patent Application No. 2008-43172, for example, can be applied to a configuration of the variable magnetic flux motor and a drive system.

Figure 3:
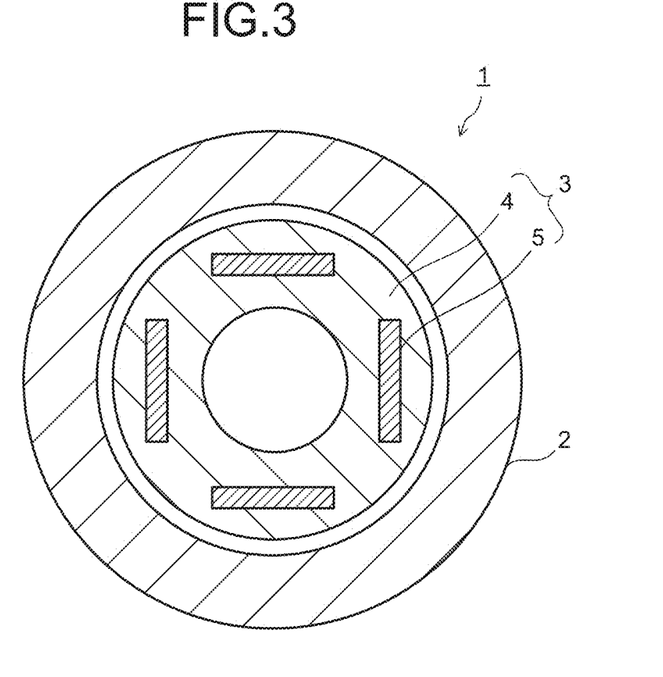
FIG. 3 is a diagram illustrating a permanent magnet motor.

Next, the rotary electrical machine provided with the above-described permanent magnet will be described with reference to the drawings. FIG. 3 is a diagram illustrating a permanent magnet motor in the present embodiment. In a permanent magnet motor 1 illustrated in FIG. 3, a rotor 3 is disposed in a stator 2. A permanent magnet 5 being the permanent magnet of the first embodiment is disposed in an iron core 4 of the rotor 3. By using the permanent magnet of the first embodiment, it is possible to realize high efficiency, reduction in size, cost reduction, and so on of the permanent magnet motor 1, based on properties or the like of each permanent magnet.

Figure 4:
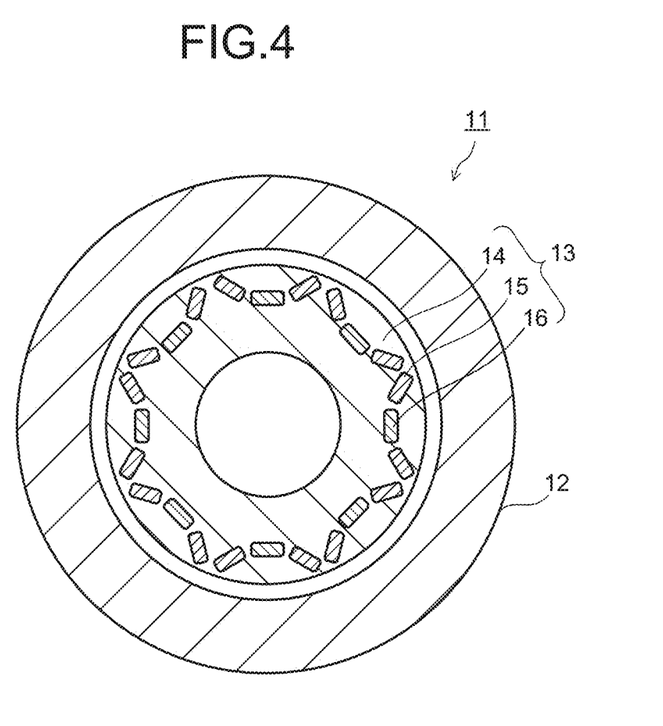
FIG. 4 is a diagram illustrating a variable magnetic flux motor.

FIG. 4 is a diagram illustrating a variable magnetic flux motor according to the present embodiment. In a variable magnetic flux motor 11 illustrated in FIG. 4, a rotor 13 is disposed in a stator 12. The permanent magnets of the first embodiment are disposed as a stationary magnet 15 and a variable magnet 16 in an iron core 14 of the rotor 13. A magnetic flux density (magnetic flux amount) of the variable magnet 16 is set to be variable. The variable magnet 16 is not influenced by a Q-axis current because its magnetization direction is perpendicular to a Q-axis direction, and can be magnetized by a D-axis current. The rotor 13 is provided with a magnetization winding (not illustrated). It is structured such that when a current is passed through the magnetization winding from a magnetizing circuit, its magnetic field directly acts on the variable magnets 16.

According to the permanent magnet of the first embodiment, it is possible to obtain the coercive force suitable for the stationary magnet 15. When the permanent magnet of the first embodiment is applied to the variable magnet 16, it is only required to control the coercive force to fall within a range of not less than 100 kA/m nor more than 500 kA/m, for example, by changing the various conditions (aging treatment condition, and the like) of the above-described manufacturing method. In the variable magnetic flux motor 11 illustrated in FIG. 4, the permanent magnet of the first embodiment can be used for both of the stationary magnet 15 and the variable magnet 16, and it is also possible that the permanent magnet of the first embodiment is used for either of the magnets. The variable magnetic flux motor 11 can output a large torque with a small device size, and thus is suitable for motors of hybrid vehicles, electric vehicles, and the like whose motors are required to have a high output and a small size.

Figure 5:
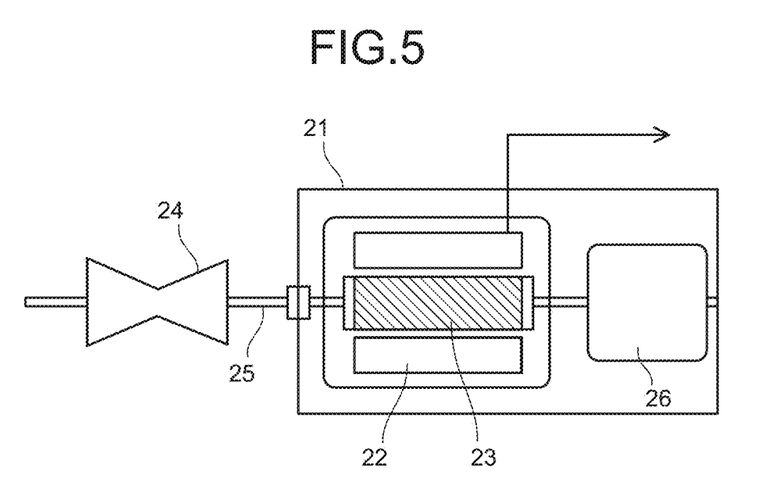
FIG. 5 is a diagram illustrating an electric generator.

FIG. 5 illustrates an electric generator according to the present embodiment. An electric generator 21 illustrated in FIG. 5 includes a stator 22 using the above-described permanent magnet. A rotor 23 disposed inside the stator 22 is connected, via a shaft 25, to a turbine 24 provided at one end of the electric generator 21. The turbine 24 is rotated by an externally supplied fluid, for example. Instead of the turbine 24 rotated by the fluid, the shaft 25 can also be rotated by transmitting dynamic rotation such as regenerative energy of a automobile. To the stator 22 and the rotor 23, various publicly-known configurations are adoptable.

The shaft 25 is in contact with a commutator (not illustrated) disposed on an opposite side of the turbine 24 in relation to the rotor 23, and electromotive force generated by the rotation of the rotor 23 is stepped up to a system voltage and transmitted as an output of the electric generator 21 through an isolated-phase bus and a main transformer (not illustrated). The electric generator 21 may be either of an ordinary electric generator and a variable magnetic flux electric generator. The rotor 23 is electrically charged due to static electricity from the turbine 2 and a shaft current accompanying the electric power generation. For this reason, the electric generator 21 includes a brush 26 for discharging charged electricity of the rotor 23.

As described above, by applying the above-described permanent magnet to the electric generator, it is possible to obtain effects such as high efficiency, reduction in size, and cost reduction.

It is to be noted that, although some embodiments of the present invention have been described, these embodiments have been presented by way of example and are not intended to limit the scope of the invention. These novel embodiments can be implemented in a variety of other modes, and various omissions, substitutions, and modifications thereof can be made within the scope that does not depart from the spirit of the invention. Such embodiments and modifications thereof are encompassed by the scope and the spirit of the invention and also encompassed by the invention set forth in the claims and equivalents thereof.

EXAMPLE

In the present example, description will be made on concrete examples of a permanent magnet. In the present example, description will be made on a permanent magnet containing Zr as the element M, and in which an Fe concentration of crystal grains forming a main phase is 28 atomic % or more.

Example 1, Example 2

Respective raw materials to be used for permanent magnets were weighed and mixed at predetermined ratios, and then subjected to arc-melting in an Ar gas atmosphere, to thereby produce alloy ingots. The above-described alloy ingots were subjected to heat treatment by being retained at 1160° C. for 12 hours, and the alloy ingots were then coarsely ground and ground by a jet mill, to thereby prepare alloy powders as raw material powders of magnets. The obtained alloy powders were press-formed in a magnetic field, to thereby produce compression-molded bodies.

Next, the compression-molded bodies of the alloy powders were disposed in a chamber of a sintering furnace, the inside of the chamber was set to a vacuum state, and the compression-molded bodies were then heated to 1225° C. and retained at the attained temperature for 10 minutes. After that, as presented in Table 2, Ar gas was introduced, and the compression-molded bodies were heated to 1240° C. in the Ar atmosphere and retained at the attained temperature for 4 hours. Next, the compression-molded bodies were cooled to 1190° C., and retained at the attained temperature for 6 hours by setting a pressure in the chamber to 0.5 MPa, to thereby perform quality improvement treatment. Next, the compression-molded bodies were subjected to slow cooling to 1135° C. as presented in Table 2 at a cooling rate of 2° C./minute, subjected to solution heat treatment by being retained at the attained temperature for 16 hours, and then cooled to a room temperature. A difference between the sintering temperature and the solution heat treatment temperature was 1240° C.−1135° C.=105° C., as presented in Table 2. A cooling rate after the solution heat treatment was set to 150° C./minute.

Next, sintered compacts after the solution heat treatment were heated to 750° C., retained at the attained temperature for 1 hour, and then subjected to slow cooling to 350° C. at a cooling rate of 2.0° C./minute. Next, as aging treatment, the sintered compacts were heated to 835° C., and retained at the attained temperature for 30 hours. Thereafter, the sintered compacts were subjected to slow cooling to 500° C. at a cooling rate of 1.0° C./minute, and retained at the attained temperature for 8 hours. After that, the sintered compacts were subjected to slow cooling to 400° C. at a cooling rate of 1.0° C./minute, and retained at the attained temperature for 1 hour. Thereafter, the sintered compacts were furnace-cooled to a room temperature, to thereby obtain magnets.

Composition analysis of the magnets was performed by an ICP method. The composition analysis by the ICP method was performed in accordance with the following procedure. First, a specimen collected from the described measurement point was ground in a mortar, a predetermined amount of the ground specimen was weighed, and put into a quartz beaker. Further, mixed acid (acid containing nitric acid and hydrochloric acid) was put into the beaker, and heated to about 140° C. on a hot plate, to thereby completely melt the specimen in the beaker. Further, after the above was left standing to cool, it was transferred to a PFA (polytetrafluoroethylene) volumetric flask, and quantified to be a specimen solution.

By using an ICP emission spectrochemical analyzer, quantities of components of the above-described specimen solution were determined by a calibration curve method. As the ICP emission spectrochemical analyzer, SPS4000 manufactured by SII Nano Technology Inc. was used. Compositions of the obtained magnets are as presented in Table 1. Further, Fe concentrations of crystal grains forming a main phase and a concentration difference of the element A among the crystal grains ($C_A$ (dis)), and further, a squareness ratio, coercive force, and residual magnetization were measured. Results thereof are presented in Table 3. HD2300 manufactured by Hitachi High-Technologies Corporation was used as a measurement apparatus in respective examples and comparative examples.

Example 3, Example 4, Example 5

Respective raw materials were weighed and mixed at predetermined ratios, and then subjected to high-frequency melting in an Ar gas atmosphere, to thereby produce alloy ingots. The alloy ingots were coarsely ground, then subjected to heat treatment at 1160° C. for 8 hours, and cooled to a room temperature by rapid cooling. Further, coarse grinding and grinding by a jet mill were performed, to thereby prepare alloy powders as raw material powders of magnets. Further, the above-described alloy powders were press-formed in a magnetic field, to thereby produce compression-molded bodies.

Next, the compression-molded bodies of the alloy powders were disposed in a chamber of a sintering furnace, the inside of the chamber was set to a vacuum state of $9.0 \times 10^{-3}$ Pa, and after that, the compression-molded bodies were heated to 1200° C. and retained at the attained temperature for 15 minutes, and then Ar gas was introduced into the chamber. The temperature in the chamber set to be under the Ar atmosphere was increased to 1235° C. as presented in Table 2, and the compression-molded bodies were subjected to sintering by being retained at the above-described attained temperature for 6 hours. Next, the compression-molded bodies were subjected to slow cooling to 1115° C. as presented in Table 2, subjected to solution heat treatment by being retained at the attained temperature for 12 hours, and then cooled to a room temperature. A cooling rate after the solution heat treatment was set to 200° C./minute. A difference between the sintering temperature and the solution heat treatment temperature was 1235° C.−1115° C.=120° C., as presented in Table 2.

Next, sintered compacts after the solution heat treatment were heated to 680° C. and retained at the attained temperature for 1 hour, and after that, treatment was continuously performed, as aging treatment, in a manner that the sintered compacts were heated to 850° C., and retained at the attained temperature for 22 hours. Thereafter, the sintered compacts were subjected to slow cooling to 370° C., and retained at the attained temperature for 8 hours. After that, the sintered compacts were furnace-cooled to a room temperature, to thereby obtain magnets.

Further, by using the above-described ICP emission spectrochemical analyzer, quantities of components of the above-described specimen solution were determined by the calibration curve method. Compositions of the obtained magnets are as presented in Table 1. Further, Fe concentrations of crystal grains forming a main phase and a concentration difference of the element A among the crystal grains ($C_A$ (dis)), and further, a squareness ratio, coercive force, and residual magnetization were measured. Results thereof are presented in Table 3.

Example 6, Example 7

Respective raw materials were weighed and mixed at predetermined ratios, and then subjected to high-frequency melting in an Ar gas atmosphere, to thereby produce alloy ingots. The alloy ingots were coarsely ground, then subjected to heat treatment at 1170° C. for 12 hours, and cooled to a room temperature by rapid cooling. Further, coarse grinding and grinding by a jet mill were performed, to thereby prepare alloy powders as raw material powders of magnets. Further, the above-described alloy powders were press-formed in a magnetic field, to thereby produce compression-molded bodies.

Next, the compression-molded bodies of the alloy powders were disposed in a chamber of a sintering furnace, the inside of the chamber was set to a vacuum state of $9.0 \times 10^{-3}$ Pa, and after that, the compression-molded bodies were heated to 1215° C. and retained at the attained temperature for 15 minutes, and then Ar gas was introduced into the chamber. The temperature in the chamber set to be under the Ar atmosphere was increased to 1225° C. as presented in Table 2, and the compression-molded bodies were subjected to sintering by being retained at the above-described attained temperature for 3 hours. Next, as presented in Table 2, the compression-molded bodies were subjected to slow cooling to 1100° C., subjected to solution heat treatment by being retained at the attained temperature for 18 hours, and then cooled to a room temperature. A cooling rate after the solution heat treatment was set to 180° C./minute. A difference between the sintering temperature and the solution heat treatment temperature was 1225° C.–1100° C.=125° C., as presented in Table 2.

Next, sintered compacts after the solution heat treatment were heated to 690° C., retained at the attained temperature for 3.5 hours, and then subjected to slow cooling to a room temperature. After that, as aging treatment, the sintered compacts were heated to 840° C., and retained at the attained temperature for 55 hours. Thereafter, the sintered compacts were subjected to slow cooling to 390° C., and retained at the attained temperature for 1.5 hours. After that, the sintered compacts were furnace-cooled to a room temperature, to thereby obtain magnets.

Compositions of the above-described respective magnets were checked by the ICP method, similarly to the other examples. The compositions of the obtained magnets are as presented in Table 1. Further, similarly to the other examples, Fe concentrations of crystal grains forming a main phase and a concentration difference of the element A among the crystal grains ($C_A$ (dis)), and further, a squareness ratio, coercive force, and residual magnetization were measured. Results thereof are presented in Table 3.

Example 8

Respective raw materials were weighed and mixed at a predetermined ratio, and then subjected to high-frequency melting in an Ar gas atmosphere, to thereby produce an alloy ingot. The above-described alloy ingot was coarsely ground, then subjected to heat treatment at 1170° C. for 9 hours, and cooled to a room temperature by rapid cooling. Further, coarse grinding and grinding by a jet mill were performed, to thereby prepare an alloy powder as a raw material powder of a magnet. Further, the above-described alloy powder was press-formed in a magnetic field, to thereby produce a compression-molded body.

Next, the compression-molded body of the alloy powder was disposed in a chamber of a sintering furnace, the inside of the chamber was set to a vacuum state of $9.0 \times 10^{-3}$ Pa, and after that, the compression-molded body was heated to 1190° C. and retained at the attained temperature for 15 minutes, and then Ar gas was introduced into the chamber. The temperature in the chamber set to be under the Ar atmosphere was increased to 1235° C. as presented in Table 2, and the compression-molded body was subjected to sintering by being retained at the above-described attained temperature for 4 hours. Next, as presented in Table 2, the compression-molded body was subjected to slow cooling to 1130° C., subjected to solution heat treatment by being retained at the attained temperature for 12 hours, and then cooled to a room temperature. A cooling rate after the solution heat treatment was set to 180° C./minute. A difference between the sintering temperature and the solution heat treatment temperature was 1235° C.–1130° C.=105° C., as presented in Table 2.

Next, a sintered compact after the solution heat treatment was heated to 705° C., retained at the attained temperature for 2 hours, and then subjected to slow cooling to a room temperature. After that, as aging treatment, the sintered compact was heated to 830° C., and retained at the attained temperature for 55 hours. Thereafter, the sintered compact was subjected to slow cooling to 420° C., and retained at the attained temperature for 1 hour. After that, the sintered compact was furnace-cooled to a room temperature, to thereby obtain a magnet.

A Composition of the above-described each magnet was checked by the ICP method, similarly to the other examples. The composition of the obtained magnet is as presented in Table 1. Further, similarly to the other examples, Fe concentrations of crystal grains forming a main phase and a concentration difference of the element A among the crystal grains ($C_A$ (dis)), and further, a squareness ratio, coercive force, and residual magnetization were measured. Results thereof are presented in Table 3.

Example 9 to Example 12

Alloy powders having the same composition as that of Example 8 were used as raw materials, and press-formed in a magnetic field, to thereby produce compression-molded bodies. Next, the compression-molded bodies of the alloy powders were disposed in a chamber of a sintering furnace, the inside of the chamber was set to a vacuum state of $9.0 \times 10^{-3}$ Pa, and after that, the compression-molded bodies were heated to 1190° C. and retained at the attained temperature for 15 minutes, and then Ar gas was introduced into the chamber. Next, the temperature in the chamber set to be under the Ar atmosphere was increased to respective sintering temperatures presented in Table 2, and the compression-molded bodies were subjected to sintering by being retained at the attained temperatures for 4 hours.

Next, the compression-molded bodies were subjected to solution heat treatment at temperatures and for periods of time presented in Table 2, and then cooled to a room temperature. A cooling rate after the solution heat treatment was set to 180° C./minute.

After that, sintered compacts after the solution heat treatment in the respective examples were subjected to aging treatment and the like, according to a method similar to that of Example 8, to thereby obtain magnets.

Compositions of the above-described respective magnets were checked by the ICP method, similarly to the other examples. The compositions of the obtained magnets are as presented in Table 1. Further, similarly to the other examples, Fe concentrations of crystal grains forming a main phase and a concentration difference of the element A among the crystal grains ($C_A$ (dis)), and further, a squareness ratio, coercive force, and residual magnetization were measured. Results thereof are presented in Table 3.

Comparative Example 1, Comparative Example 2

Magnets having compositions presented in Table 1 were produced by the same methods as those of Example 1 and Example 2, respectively. Further, similarly to the examples, Fe concentrations of crystal grains forming a main phase and a variation of concentrations of the element A, and further, a squareness ratio, coercive force, and residual magnetization were measured. Results thereof are presented in Table 3.

Comparative Example 3 to Comparative Example 6

Alloy powders having the same composition as that of Example 8 were used as raw materials, and press-formed in a magnetic field, to thereby produce compression-molded bodies. Next, the compression-molded bodies of the alloy powders were disposed in a chamber of a sintering furnace, the inside of the chamber was set to a vacuum state of $9.0 \times 10^{-3}$ Pa, and after that, the compression-molded bodies were heated to 1190° C. and retained at the attained temperature for 15 minutes, and then Ar gas was introduced into the chamber. Next, the temperature in the chamber set to be under the Ar atmosphere was increased to respective sintering temperatures presented in Table 2, and the compression-molded bodies were subjected to sintering by being retained at the attained temperatures for 4 hours.

After that, solution heat treatment was performed in the respective comparative examples at temperatures and for periods of time of solution heat treatment presented in Table 2, under conditions similar to those of Example 8, and aging treatment and the like were performed, to thereby obtain magnets.

Compositions of the above-described respective magnets were checked by the ICP method, similarly to the other examples. The compositions of the obtained magnets are as presented in Table 1. Further, similarly to the other examples, Fe concentrations of crystal grains forming a main phase and a concentration difference of the element A among the crystal grains ($C_A$ (dis)), and further, a squareness ratio, coercive force, and residual magnetization were measured. Results thereof are presented in Table 3.

As described above, in the permanent magnet of each of the examples, the reduction in magnetization is suppressed by controlling the variation of the Fe concentration and the element A in the crystal grains forming the main phase, and even in the case where the permanent magnet of each of the examples has the composition with the Fe concentration of 28 atomic % or more, it exerts a good squareness ratio, high coercive force, and high magnetization. On the contrary, it can be understood that in Comparative Examples 1 and 2, the compositions are greatly deviated, and sufficient magnetic properties are not obtained due to reasons such as generation of hetero-phase. In Comparative Example 3, the sintering temperature is high, and thus sufficient magnetic properties are not obtained. In Comparative Example 4, the sintering temperature is low, and thus sufficient magnetic properties are not obtained. In Comparative Example 5, the difference between the sintering temperature and the solution heat treatment temperature is small, and thus sufficient magnetic properties are not obtained. In Comparative Example 6, the solution heat treatment time is short, and thus sufficient magnetic properties are not obtained.

TABLE 1

Magnet composition (atomic ratio)
(Element A) Example 1: Ce, Examples 2, 4: Nd, Examples 3, 5 to 12: Pr, Comparative Example 1: Ce, Comparative Example 2: Nd, Comparative Examples 3 to 6: Pr
(Others) Example 1: Nd, Example 2: Ti, Example 3: Ni, Example 4: Cr, Example 5: Al + Cr, Comparative Example 1: Cr, Comparative Example 2: Ti)

| | Sm | A | Co | Fe | Cu | Zr | Other |
|---|---|---|---|---|---|---|---|
| Example 1 | 10.33 | 0.78 | 52.31 | 28.09 | 5.29 | 3.2 | 0 |
| Example 2 | 10.94 | 1.22 | 52.19 | 28.11 | 5.71 | 1.61 | 0.22 |
| Example 3 | 9.18 | 1.62 | 53.47 | 28.99 | 4.91 | 1.56 | 0.27 |
| Example 4 | 9.53 | 2.09 | 52.91 | 29.52 | 4.07 | 1.77 | 0.11 |
| Example 5 | 10.59 | 1.18 | 47.48 | 29.12 | 9.88 | 1.61 | 0.14 |
| Example 6 | 9.78 | 1.46 | 50.5 | 31.51 | 5.15 | 1.6 | 0 |
| Example 7 | 9.77 | 1.86 | 49.4 | 32.52 | 5.04 | 1.41 | 0 |
| Example 8 | 10.65 | 1.18 | 50.49 | 30.77 | 5.29 | 1.62 | 0 |
| Example 9 | 10.65 | 1.18 | 50.49 | 30.77 | 5.29 | 1.62 | 0 |
| Example 10 | 10.65 | 1.18 | 50.49 | 30.77 | 5.29 | 1.62 | 0 |
| Example 11 | 10.65 | 1.18 | 50.49 | 30.77 | 5.29 | 1.62 | 0 |
| Example 12 | 10.65 | 1.18 | 50.49 | 30.77 | 5.29 | 1.62 | 0 |
| Comparative Example 1 | 12.08 | 0.91 | 51.2 | 27.5 | 5.18 | 3.13 | 0 |
| Comparative Example 2 | 10.94 | 1.22 | 45.89 | 28.11 | 5.71 | 7.91 | 0.22 |
| Comparative Example 3 | 10.65 | 1.18 | 50.49 | 30.77 | 5.29 | 1.62 | 0 |
| Comparative Example 4 | 10.65 | 1.18 | 50.49 | 30.77 | 5.29 | 1.62 | 0 |
| Comparative Example 5 | 10.65 | 1.18 | 50.49 | 30.77 | 5.29 | 1.62 | 0 |
| Comparative Example 6 | 10.65 | 1.18 | 50.49 | 30.77 | 5.29 | 1.62 | 0 |

TABLE 2

| | Sintering temperature (° C.) | Solution treatment temperature (° C.) | Difference between sintering temperature and solution heat treatment temperature (° C.) | Solution heat treatment time (hour) |
|---|---|---|---|---|
| Example 1 | 1240 | 1135 | 105 | 16 |
| Example 2 | 1240 | 1135 | 105 | 16 |
| Example 3 | 1235 | 1115 | 120 | 12 |
| Example 4 | 1235 | 1115 | 120 | 12 |
| Example 5 | 1235 | 1115 | 120 | 12 |
| Example 6 | 1225 | 1100 | 125 | 18 |
| Example 7 | 1225 | 1100 | 125 | 18 |
| Example 8 | 1235 | 1130 | 105 | 16 |
| Example 9 | 1250 | 1130 | 120 | 16 |
| Example 10 | 1225 | 1130 | 95 | 16 |
| Example 11 | 1235 | 1110 | 125 | 12 |
| Example 12 | 1235 | 1130 | 105 | 22 |
| Comparative Example 1 | 1240 | 1135 | 105 | 16 |
| Comparative Example 2 | 1240 | 1135 | 105 | 16 |

TABLE 2-continued

| | Sintering temperature (° C.) | Solution treatment temperature (° C.) | Difference between sintering temperature and solution heat treatment temperature (° C.) | Solution heat treatment time (hour) |
|---|---|---|---|---|
| Comparative Example 3 | 1270 | 1130 | 140 | 16 |
| Comparative Example 4 | 1190 | 1130 | 60 | 16 |
| Comparative Example 5 | 1235 | 1165 | 70 | 16 |
| Comparative Example 6 | 1235 | 1130 | 105 | 4 |

TABLE 3

| | $C_A$ (dis) | Squareness ratio (%) | Coercive force iHc (kA/m) | Residual magnetization Br (T) |
|---|---|---|---|---|
| Example 1 | 0.9 | 92.5 | 1800 | 1.2 |
| Example 2 | 1.6 | 93.2 | 1710 | 1.215 |
| Example 3 | 1.9 | 92 | 1850 | 1.225 |
| Example 4 | 2.4 | 91.5 | 1690 | 1.23 |
| Example 5 | 1.1 | 92.4 | 1655 | 1.22 |
| Example 6 | 1.9 | 91.9 | 1630 | 1.235 |
| Example 7 | 1.5 | 91.5 | 1600 | 1.24 |
| Example 8 | 1.2 | 92 | 1690 | 1.23 |
| Example 9 | 0.6 | 93.5 | 1720 | 1.23 |
| Example 10 | 1.7 | 91.4 | 1650 | 1.225 |
| Example 11 | 1.4 | 91.9 | 1750 | 1.23 |
| Example 12 | 1.4 | 92.1 | 1735 | 1.23 |
| Comparative Example 1 | 3.9 | 55.4 | 310 | 1.14 |
| Comparative Example 2 | 4.5 | 60.4 | 450 | 1.165 |
| Comparative Example 3 | 4.3 | 79.4 | 1100 | 1.14 |
| Comparative Example 4 | 3.6 | 45.4 | 1210 | 1.125 |
| Comparative Example 5 | 3.4 | 80.5 | 990 | 1.12 |
| Comparative Example 6 | 3.3 | 81.4 | 1050 | 1.12 |

What is claimed is:

1. A permanent magnet expressed by a composition formula:

$$(R_{1-x}A_x)_p Fe_q M_r Cu_t Co_{100-p-q-r-t}$$

where A is at least one element selected from the group consisting of Ce, Pr, and Nd, R is at least one element selected from the group consisting of rare earth elements except for the element A, M is at least one element selected from the group consisting of Zr, Ti, and Hf, x is a number satisfying 0.02≤x≤0.2, p is a number satisfying 10.5≤p≤12.4 atomic %, q is a number satisfying 28≤q≤40 atomic %, r is a number satisfying 0.88≤r≤4.3 atomic %, t is a number satisfying 3.5≤t≤13.5 atomic %, and an atomic ratio of the element A is 0.78 atomic % or more and 2.09 atomic % or less, the magnet comprising:
a metal structure including a plurality of crystal grains which constitutes a main phase having a $Th_2Zn_{17}$ crystal phase,
wherein an Fe concentration of each of the crystal grains is 28 atomic % or more,
a concentration difference of the element A among the crystal grains is not less than 0.2 atomic % nor more than 3.0 atomic %, and
a squareness ratio of the magnet is 92.4% or more.

2. The magnet according to claim 1, wherein 50 atomic % or more of the element A in the composition formula is Pr.

3. The magnet according to claim 1, wherein 50 atomic % or more of the element R in the composition formula is Sm, and 50 atomic % or more of the element M in the composition formula is Zr.

4. A rotary electrical machine, comprising the permanent magnet according to claim 1.

5. The magnet according to claim 1,
wherein the squareness ratio is 93.2% or more.

6. A permanent magnet expressed by a composition formula:

$$(R_{1-x}A_x)_p Fe_q M_r Cu_t (Co_{100-y}B_y)_{100-p-q-r-t}$$

where A is at least one element selected from the group consisting of Ce, Pr, and Nd, R is at least one element selected from the group consisting of rare earth elements except for the element A, M is at least one element selected from the group consisting of Zr, Ti, and Hf, B is at least one element selected from the group consisting of Ni, V, Cr, Mn, Al, Ga, Nb, Ta, and W, x is a number satisfying 0.02≤x≤0.2, p is a number satisfying 10.5≤p≤12.4 atomic %, q is a number satisfying 28≤q≤40 atomic %, r is a number satisfying 0.88≤r≤4.3 atomic %, t is a number satisfying 3.5≤t≤13.5 atomic %, y is a number satisfying y≤20 atomic %, and an atomic ratio of the element A is 0.78 atomic % or more and 2.09 atomic % or less, the magnet comprising:
a metal structure including a plurality of crystal grains which constitutes a main phase having a $Th_2Zn_{17}$ crystal phase,
wherein an Fe concentration of each of the crystal grains is 28 atomic % or more,
a concentration difference of the element A among the crystal grains is not less than 0.2 atomic % nor more than 3.0 atomic %, and
a squareness ratio of the magnet is 92.4% or more.

7. A permanent magnet expressed by a composition formula:

$$(R_{1-x}A_x)_p Fe_q M_r Cu_t Co_{100-p-q-r-t}$$

where A is at least one element selected from the group consisting of Ce, Pr, and Nd, R is at least one element selected from the group consisting of rare earth elements except for the element A, M is at least one element selected from the group consisting of Zr, Ti, and Hf, x is a number satisfying 0.02≤x≤0.2, p is a number satisfying 10.5≤p≤12.4 atomic %, q is a number satisfying 28≤q≤40 atomic %, r is a number satisfying 0.88≤r≤4.3 atomic %, and t is a number satisfying 3.5≤t≤13.5 atomic %, and a total of the element A and the element M is 2.79 atomic % or more and 3.98 atomic % or less, the magnet comprising:
a metal structure including a plurality of crystal grains which constitutes a main phase having a $Th_2Zn_{17}$ crystal phase,
wherein an Fe concentration of each of the crystal grains is 28 atomic % or more,
a concentration difference of the element A among the crystal grains is not less than 0.2 atomic % nor more than 3.0 atomic %, and
a squareness ratio of the magnet is 92.4% or more.

* * * * *